United States Patent [19]
Goldberg

[11] 3,730,331
[45] May 1, 1973

[54] CONVEYOR DEVICE
[75] Inventor: Nathaniel D. Goldberg, Chicago, Ill.
[73] Assignee: Fenco, Inc., Chicago, Ill.
[22] Filed: Jan. 10, 1972
[21] Appl. No.: 216,477

Related U.S. Application Data

[63] Continuation of Ser. No. 75,349, Sept. 25, 1970, abandoned.

[52] U.S. Cl. .................... 198/189, 104/25, 198/181
[51] Int. Cl. .............................................. B65g 15/00
[58] Field of Search ................ 198/181, 16 MS, 168, 198/189; 104/25

[56] References Cited

UNITED STATES PATENTS

| 2,157,283 | 5/1939 | Dayson | 198/181 X |
| 763,431 | 6/1904 | Schmidt et al. | 104/25 |
| 1,817,373 | 8/1931 | Hopkins | 198/181 |

FOREIGN PATENTS OR APPLICATIONS

| 1,008,491 | 2/1952 | France | 198/181 |

*Primary Examiner*—Evon C. Blunk
*Assistant Examiner*—Douglas D. Watts
*Attorney*—Olson, Trexler, Wolters & Bushnell

[57] ABSTRACT

The present invention relates generally to improvements in conveyor devices and more particularly to chain type conveyor mechanisms adapted to convey articles along paths which are both straight and curved. The embodiment of the invention disclosed herein contemplates link means or members having upwardly facing surface sections for supporting an article to be conveyed. Each link includes universal type coupling means for connecting a link member to an adjacent complementary link member and also means for accommodating the periphery of complementary sprockets. The axis of one sprocket is substantially vertical and the axis of the other is substantially horizontal. The upper side of the sprockets rotatable about the vertical axis are positioned beneath the upwardly facing surface sections so as to counteract tendencies for said sections to tilt as they move along the aforesaid curved path.

7 Claims, 8 Drawing Figures

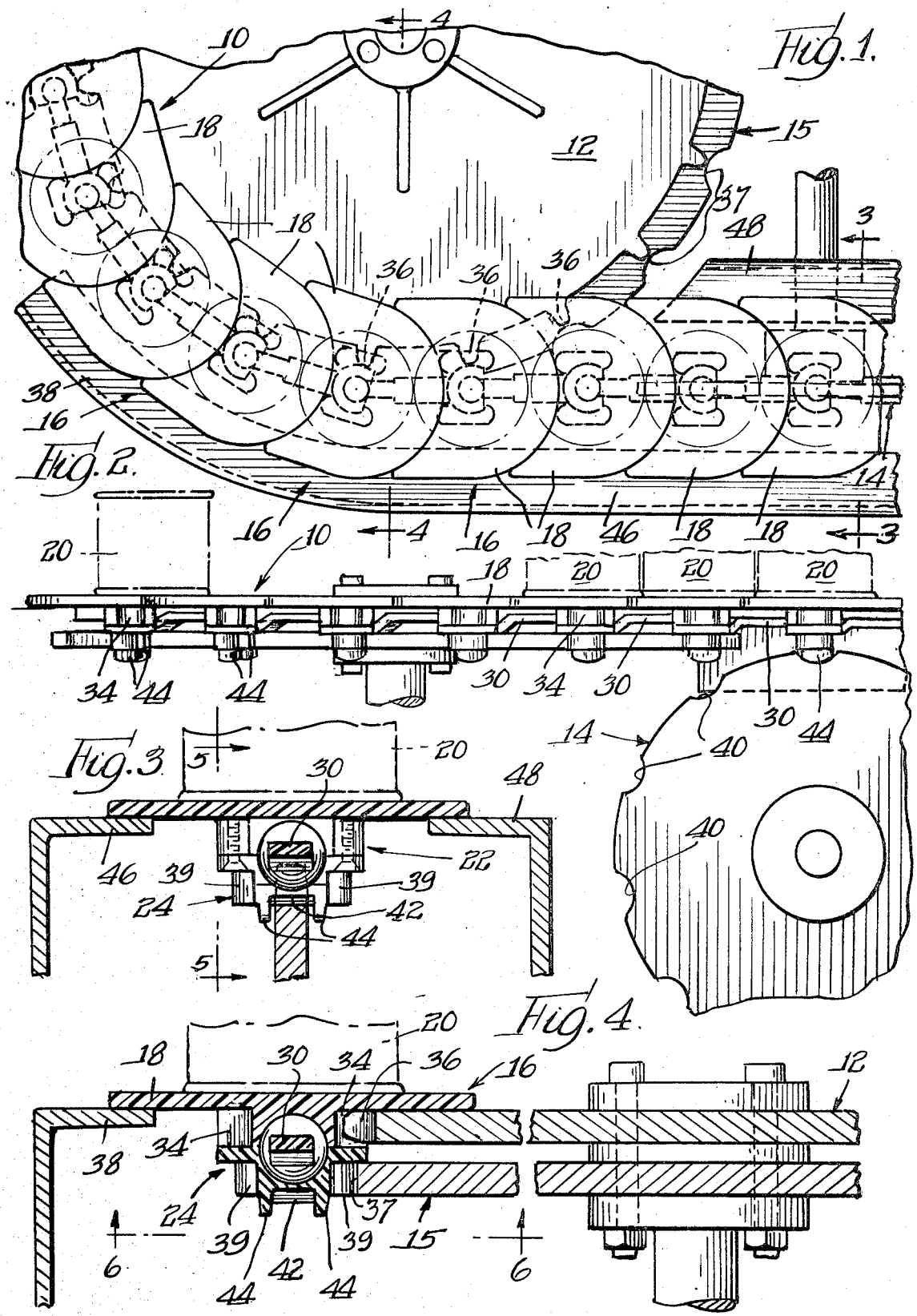

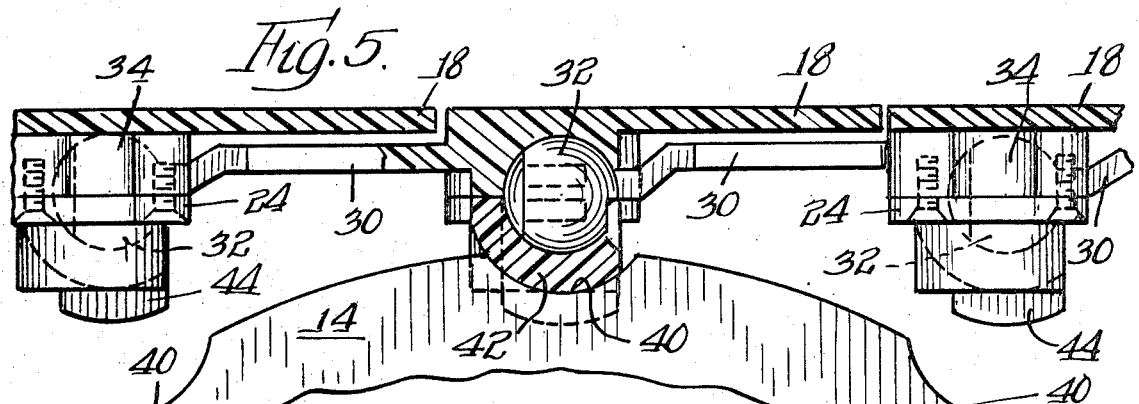
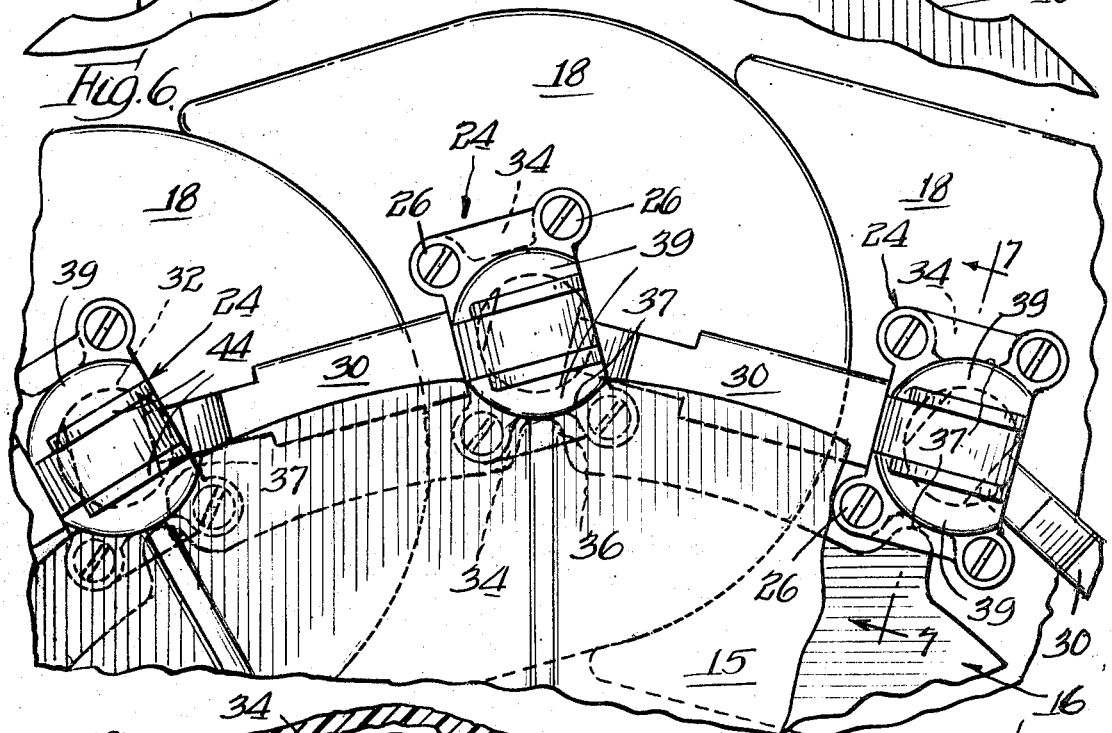
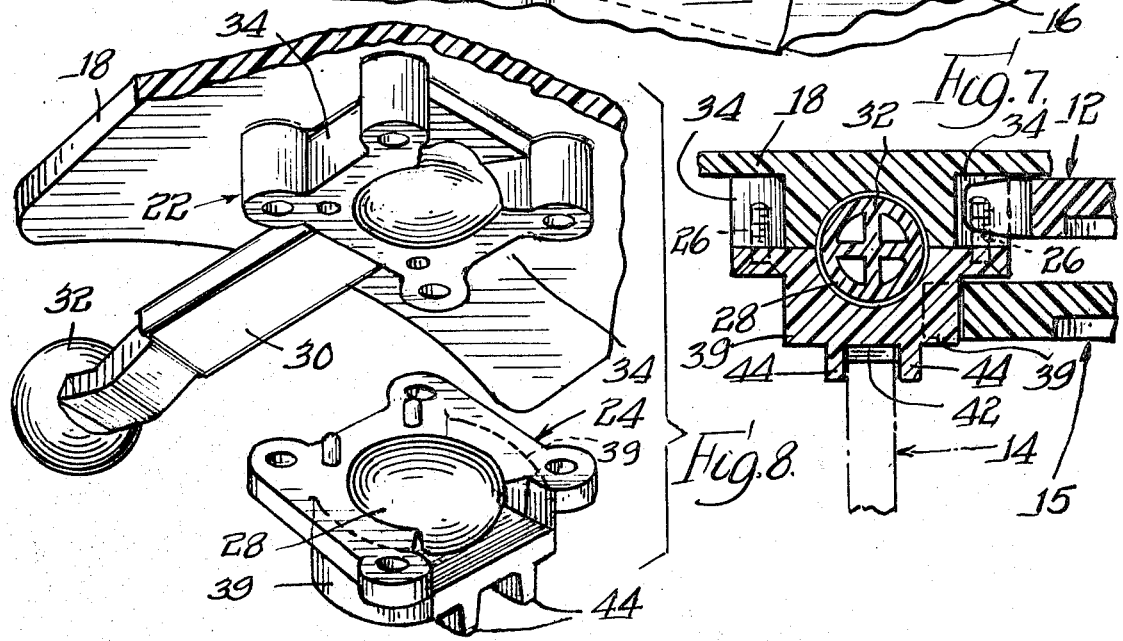

CONVEYOR DEVICE

The present application is a continuation of the copending application Ser. No. 75,349, filed Sept. 25, 1970 now abandoned.

DISCLOSURE OF THE INVENTION

Conveyor chains have heretofore been driven by sprockets which rotate about a substantially horizontal axis, the periphery of said sprockets engaging the underside of the link members. Such sprockets are not adaptable to engage the underside of a link member as it travels along an arcuate or curved path, but are practical for engagement of the link member as it moves along a relatively straight path. The present invention is directed to an improved conveyor structure, the individual links of which are especially designed to accommodate and be driven by a sprocket means rotatable about a substantially vertical axis.

It is an object of the present invention to provide a conveyor device as set forth above in which a substantially horizontally disposed sprocket member revolving about a vertical axis may be employed to support the underside of a conveyor plate and also to permit such plates to move along a curved path.

More specifically, the present invention contemplates an improved conveyor mechanism in which the conveyor plates and linkage means for coupling said plates are of unique and practical design.

It is a further object of the present invention to provide an improved link member, arranged along its underside so as to accommodate novel sprocket means rotatable about a substantially vertical axis as the conveyor plate moves along a curved path and also to accommodate the periphery of a conveyor sprocket which is substantially vertically disposed and rotates about a substantially horizontal axis.

The present invention also contemplates a conveyor arrangement which is so designed as to enable the manufacture thereof by employing plastic molding methods, thereby assuring economical production costs.

BRIEF DESCRIPTION OF THE DRAWINGS

The foregoing and other objects and advantages will be more apparent from the following detailed description when considered in connection with the accompanying drawings wherein:

FIG. 1 is a fragmentary plan view of a conveyor arrangement representing one embodiment of the present invention.

FIG. 2 is a side elevational view of the conveyor device shown in FIG. 1;

FIG. 3 is a detailed vertical sectional view taken substantially along line 3—3 of FIG. 2;

FIG. 4 is also a vertical sectional view taken substantially along line 4—4 of FIG. 1;

FIG. 5 is an enlarged fragmentary transverse sectional view taken substantially along the line 5—5 of FIG. 3;

FIG. 6 is an enlarged fragmentary view of the underside of a conveyor device as viewed along the line 6—6 of FIG. 4;

FIG. 7 is a detailed transverse sectional view taken substantially along the line 7—7 of FIG. 6; and FIG. 8 is a perspective view of the parts constituting the underside of the link device, sections of the universal or ball accommodating socket portions of the link being illustrated in separated relation for clarity of disclosure.

Referring now to the drawings more in detail wherein like numerals have been employed to designate similar parts throughout the various views it will be seen that the conveyor mechanism or chain is designated generally by the numeral 10. A chain driving sprocket rotatable about a substantially vertical axis is designated generally by the numeral 12. As will be seen from the description which follows, the sprocket 12 is located in the area where the conveyor moves along a curved or arcuate path. A second sprocket member rotatable about a substantially horizontal axis is designated generally by the numeral 14. A third sprocket member 15 is rotatable about a vertical axis and suitably affixed to and spaced from the underside of the sprocket member 12.

The conveyor or chain is comprised of a plurality of connected link sections designated generally by the numeral 16. Each of the link sections 16 include an upwardly facing surface portion or plate 18, preferably formed of suitable molded plastic material. The plates 18 are designed to accommodate articles to be conveyed, for example, the containers 20 shown in FIGS. 3 and 4.

Each of the link sections 16 are identical structurally and therefore a description of one will suffice. Particular attention is directed to the fact that the underside of each of the plate portions 18 support a pair of coupling members 22 and 24, see FIG. 8. The member 22 is formed integral with and depends from the underside of the plate, and the member 24 is secured to the underside of the member 22 by means of screws 26 shown in FIG. 7. The members 22 and 24 cooperate to provide a spherical recess or socket 28. Extending substantially horizontally from and formed integral with the member 22 and plate 18 is a link arm 30, the free extremity of which is provided with an integral spherical portion 32. The socket or recess 28 defined by the members 22 and 24 is adapted to accommodate the ball or spherical portion of the next adjacent section 16, thereby establishing a universal type coupling.

Particular attention is directed to the fact that opposite sides of the member 22 are formed with recesses 34. These recesses 34 are adapted to accommodate or mesh with teeth 36 of the previously mentioned sprocket member 12 as clearly shown in FIG. 6. The upper surface of the horizontally disposed sprocket 12 is adapted to support the under surface of the plate members 18 as these plate members move along a curved or arcuate path as shown in FIGS. 1 and 4. Thus any tendency for the plate members 18 to tilt downwardly along their inner margins is counteracted by the presence of the upper surface of the sprocket member 12. The opposite under surfaces of the plate member 18 are supported by a horizontally disposed and arcuately formed frame member or strip 38, FIGS. 1 and 4. It will be seen from FIG. 1 that the arcuate path followed by the link section 16 conforms with the curvature of the periphery of the sprocket member 12.

The previously mentioned sprocket member 15 is provided with a plurality of peripheral recesses or notches 37 adapted to accommodate complementary projections or protuberances 39 formed integral with and extending from opposite sides of the member 24. In this manner further stability is contributed to the plates 18 as they move along a common path.

The periphery of the driving sprocket 14 meshes with the underside of each succeeding link section 16 by reason of peripheral recesses 40 meshing with a complementary portion 42 carried along the underside of the member 24, FIG. 5. This structure is similar to the structure shown in the U.S. Pat. to Von Hofen 3,344,905. Spaced guides 44 extend downwardly from each of the members 24 as clearly shown in FIGS. 5, 7 and 8. The driving sprocket 14 cooperates with the underside of the straight portion of the conveyor device 10 as distinguished from the driving sprockets 12 and 15 which engage the portion of the chain conveyor moving along the curved or arcuate path. Guide members 46 and 48, FIGS. 2 and 3, serve as supports for the underside of the plate members 18 as they are moved along the straight portion of the path of travel. Suitable driving mechanism (not shown) serves to impart rotation to the sprocket members 12 and 14.

From the foregoing it will be apparent that applicant provides a novel and very practical link section for conveyors of the chain type disclosed herein. The conveyor design contemplated by the present invention lends itself for economic production by the use of conventional plastic molding methods. By having the coupling members 22 and 24 positioned on the underside of the plate 18 adjacent to the trailing margin thereof in combination with the elongate member or arm 30 supporting the ball member 32 the ease and stability with which the plate member 18 may be shifted along a curved path is greatly enhanced. Attention is directed to the fact that the upper surface of each of the arms 30 serves as a support for the forward margin of the next adjacent plate member. The arm 30, the ball 32 and the coupling member 22 may be formed integral as shown in FIG. 8. The free extremity of the arm 30 is deflected laterally to facilitate proper association of the ball 32 with the next adjacent socket 28. By having the recesses 34 positioned immediately adjacent the underside of the complementary plate 18, it is possible for the upper surface of the driving sprocket 12 to be positioned immediately adjacent and thereby support the underside of said plate. Thus the present invention contemplates the provision of a conveyor link section which functions more efficiently and may be produced at minimum cost. It will be noted also that the sprocket tooth accommodatig recesses 34 are provided on opposite sides of the member 22 and that the protuberances 37 are formed on opposite sides of the member 24. This construction makes it possible to employ sprockets on either side of the conveyor plates.

The invention is claimed as follows:

1. In a conveyor chain device having at least two adjacent link means, each said link means including: an upwardly facing substantially horizontal carrier plate section for supporting an article to be conveyed, said plate section being defined by concave and convex margins; said link means also including an elongate link arm integral with said carrier plate section and extending in substantial parallelism therewith beyond an adjacent margin thereof, a ball section formed integral with one extremity of said link arm, said link arm having an upwardly facing support surface underlying and providing support for the plate section of the adjacent link means, a first socket section formed integral with the opposite extremity of said link arm and said plate sections, said first socket section being positioned on the underside of said carrier plate section proximate said adjacent margin; a second complementary socket section detachably secured to the underside of said first socket section; said first and second socket sections being cooperatively disposed to accommodate therebetween the ball section of another adjacent link means; and means associated with the side of one of said socket sections for accommodating the periphery of a drive sprocket rotatable about a substantially vertical axis; and means associated with the underside of said second socket section for accommodating the periphery of a drive sprocket rotatable about a substantially horizontal axis.

2. In a conveyor chain device as set forth in claim 1, wherein said means associated with the side of one of said socket sections comprises a recess formed in said first socket section.

3. In a conveyor chain device as set forth in claim 1, wherein said means associated with the side of one of said socket sections comprises at least one projection formed on said sscond socket section.

4. In a conveyor chain device as set forth in claim 1, further including means associated with the side of the other of said socket sections for accommodating the periphery of a second drive sprocket rotatable about a substantially vertical axis.

5. In a conveyor device as set forth in claim 4 wherein said means associated with said socket sections for accommodating the periphery of said drive sprockets comprise, a recess formed on said first socket section and a projection formed on said second socket section.

6. In a conveyor device as set forth in claim 1, wherein said adjacent margin is said concave margin.

7. In a conveyor device as set forth in claim 1 wherein said means associated with the under side of said second socket section comprises a projection adapted for accommodation by a recess formed in the periphery of a drive sprocket.

* * * * *